(12) United States Patent
Kuhlman et al.

(10) Patent No.: US 8,398,282 B2
(45) Date of Patent: Mar. 19, 2013

(54) VEHICLE FRONT LIGHTING ASSEMBLY AND SYSTEMS HAVING A VARIABLE TINT ELECTROWETTING ELEMENT

(75) Inventors: Frederick F. Kuhlman, Kokomo, IN (US); Dwadasi H. R. Sarma, Kokomo, IN (US); Nasser Lukmani, West Bloomfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 20 days.

(21) Appl. No.: 13/106,433

(22) Filed: May 12, 2011

(65) Prior Publication Data

US 2012/0287657 A1    Nov. 15, 2012

(51) Int. Cl.
*F21V 11/00* (2006.01)
*F21V 9/00* (2006.01)

(52) U.S. Cl. ......... 362/510; 362/540; 362/541; 362/542

(58) Field of Classification Search .................. 362/510, 362/540, 541, 542
See application file for complete search history.

(56) References Cited

U.S. PATENT DOCUMENTS

| 7,126,903 B2 * | 10/2006 | Feenstra et al. .......... 369/112.23 |
| 7,168,834 B2 * | 1/2007 | Takeda et al. ................. 362/510 |
| 2006/0227567 A1 * | 10/2006 | Voeller et al. ................. 362/512 |
| 2009/0122417 A1 * | 5/2009 | Hou .............................. 359/665 |
| 2009/0296408 A1 * | 12/2009 | Hendriks et al. ......... 362/311.01 |
| 2009/0323369 A1 * | 12/2009 | Van As et al. ................. 362/514 |
| 2010/0044441 A1 | 2/2010 | Cohen et al. |

OTHER PUBLICATIONS

"Recent Progress in Arrayed Electrowetting Optics"; Jason Heikenfeld, Neil Smith, Manjeet Dhindsa, Kaichang Zhou, Murali Kilaru, Linlin Hou, Jilin Zhang, Eric Kreit and Balaji Raj; Optics & Photonics News, Jan. 2009, pp. 20-26.

Disclosed Anonymously, "Adjustable car headlights using electrowetting lens", IP.com No. IPCOM000132016D, Nov. 29, 2005, four pages.

* cited by examiner

*Primary Examiner* — Stephen F Husar
*Assistant Examiner* — James Cranson, Jr.
(74) *Attorney, Agent, or Firm* — Lawrence D. Hazelton

(57) ABSTRACT

A vehicle front lighting assembly, or headlight assembly, that includes one or more variable tint electrowetting elements overlying a portion of the assembly lens surface. The variable tint electrowetting element is configured to operate to a transparent state whereby the hue of light passing therethrough is not changed, and a tinted state where the hue of light passing therethrough is changed. Alternatively, the variable tint electrowetting element is configured to operate to the tinted state and an opaque state where light is blocked from passing through the electrowetting element. The assembly may use light emitting diodes (LED) as an alternative to more conventional light sources.

10 Claims, 3 Drawing Sheets

VEHICLE FRONT LIGHTING ASSEMBLY AND SYSTEMS HAVING A VARIABLE TINT ELECTROWETTING ELEMENT

TECHNICAL FIELD OF INVENTION

The invention generally relates to vehicle front lighting assemblies, and more particularly relates to a vehicle front lighting assembly that includes a variable tint electrowetting element.

BACKGROUND OF INVENTION

Vehicle lighting assemblies installed on the front end of vehicles generally have distinct bulbs for the headlight and the turn indicator. Light for the turn indicator has a yellow or amber hue so that it can be distinguished from the headlight.

SUMMARY OF THE INVENTION

In accordance with one embodiment of this invention, a vehicle front lighting assembly is provided. The assembly defines a lens surface. The assembly includes a light source and a variable tint electrowetting element. The light source is configured to project light toward the lens surface. The variable tint electrowetting element overlays a portion of the lens surface. The variable tint electrowetting element is operable to a transparent state whereby the hue of light passing therethrough is not substantially changed, and a tinted state where the hue of light passing therethrough is changed.

In accordance with one embodiment of this invention, the variable tint electrowetting element is operable to provide a turn indicator for a vehicle.

In another embodiment of the present invention, a vehicle front lighting system is provided. The system includes a light source and a variable tint electrowetting element. The light source is configured to project light toward a lens surface. The variable tint electrowetting element overlays a portion of the lens surface. The variable tint electrowetting element is operable to a transparent state whereby the hue of light passing therethrough is not substantially changed, and a tinted state where the hue of light passing therethrough is changed; and a controller configured to determine the state of the variable tint electrowetting element based on a light control signal.

In yet another embodiment of the present invention, a vehicle front lighting assembly is provided. The assembly includes a light source configured to project light toward the lens surface. The assembly also includes a variable tint electrowetting element overlying a portion of the lens surface. In this embodiment the variable tint electrowetting element is operable to an opaque state whereby light is prevented from passing therethrough, and a tinted state where the hue of light passing therethrough is changed.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
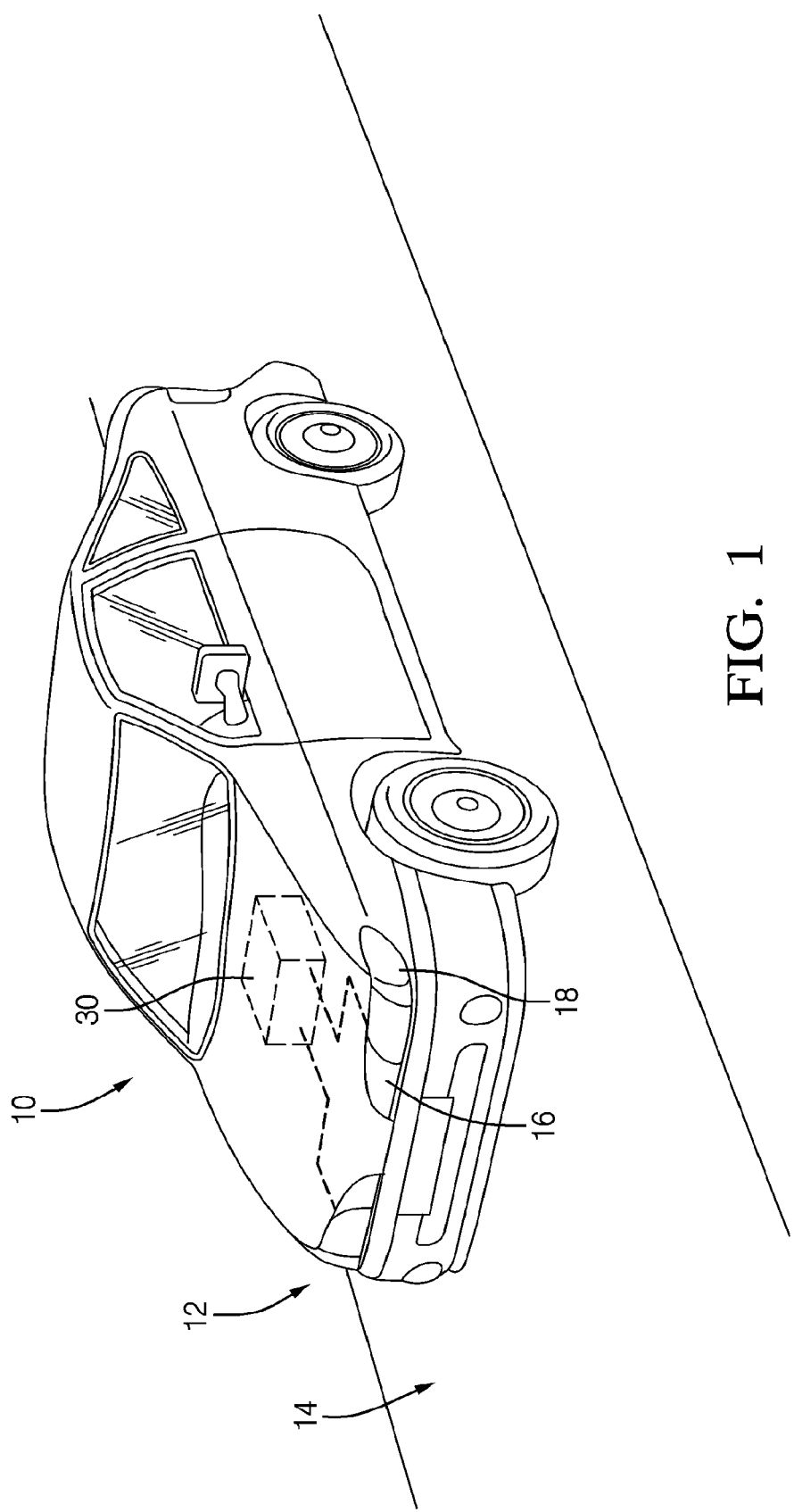
FIG. 1 is a perspective view of a vehicle equipped with a vehicle front lighting assembly in accordance with one embodiment.

FIG. 1 illustrates a non-limiting example of a vehicle 10 equipped with a front lighting assembly 12. As used herein, the front lighting assembly 12 is configured to provide both the forward illumination of a roadway 14 traveled by the vehicle 10 in a manner typically associated with a headlight or headlamp, and varying/tinted illumination typically associated with a turn indicator or turn signal. In general, the front lighting assembly 12 has two sections, a headlight portion 16 that generally provides forward illumination of the roadway 14, and a turn indicator portion 18 that in this non-limiting example projects amber or yellow light forward and sideways from the vehicle 10 so a person operating an on-coming or side-approaching vehicle are provided an indication of the intentions of the operator (not shown) of the vehicle 10. As will be described in more detail below, an advantage of the front lighting assembly 12 described herein is that light projected from the turn indicator portion 18 may be used to supplement light from the headlight portion 16 for roadway illumination when a turn is not being indicated. Otherwise, light projected from the turn indicator portion 18 may be variably tinted in a manner that others will readily recognize as an indication that the vehicle 10 may execute a turn.

Figure 2:
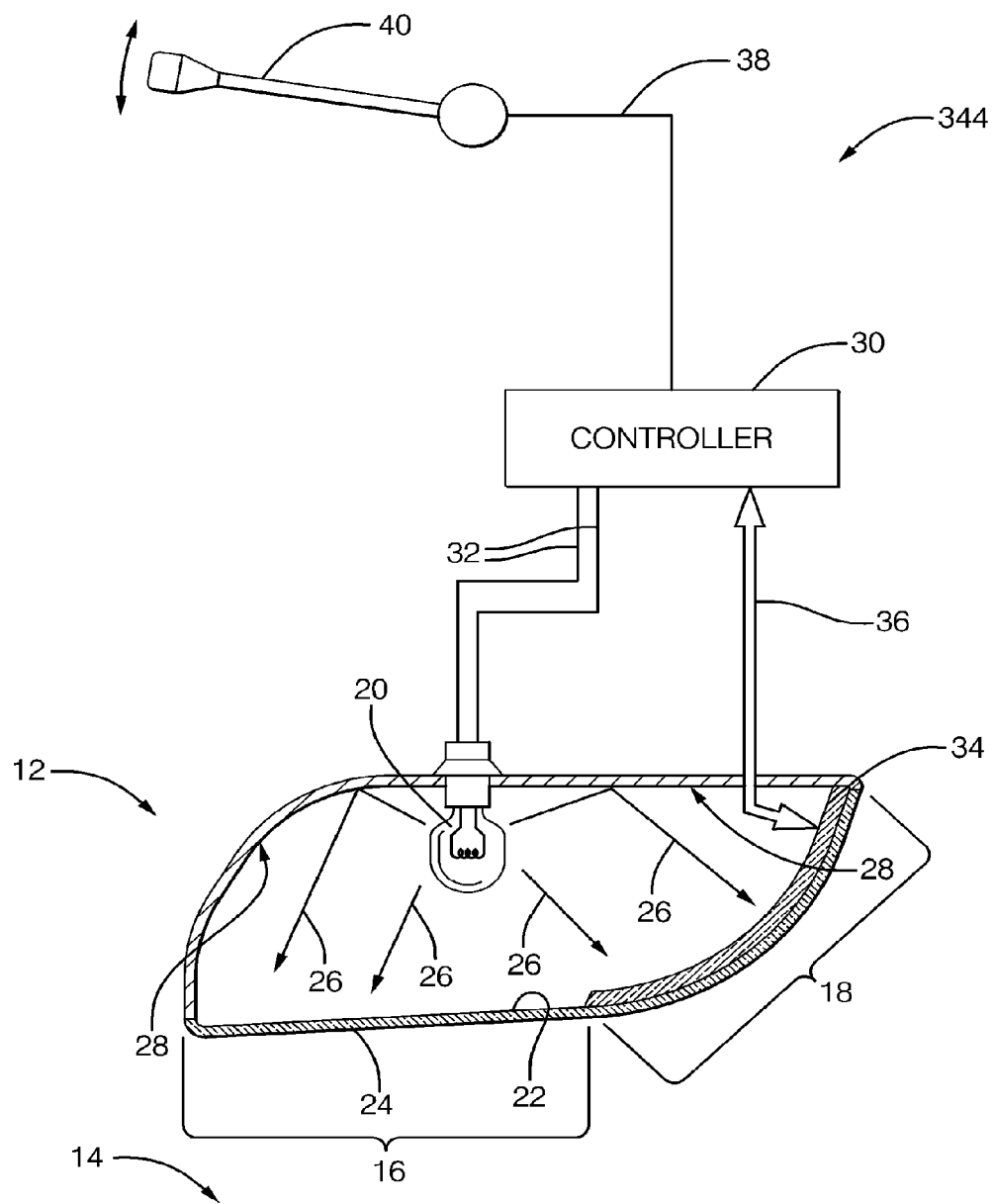
FIG. 2 is block diagram of a vehicle front lighting system including a top cut-away view of a vehicle front lighting assembly in accordance with one embodiment.

FIG. 2 illustrates a top cut-away view of a non-limiting example of the front lighting assembly 12, corresponding to the drivers-side front lighting assembly shown in FIG. 1. The front lighting assembly 12 may be equipped with a light source 20 illustrated here as a single light bulb, for example a halogen light bulb. An advantage of this configuration is that a single light bulb can provide light for both forward roadway 14 lighting and turn indication. In another embodiment, the light source 20 may be a light emitting diode, or an array of light emitting diodes. The light source 20 may be configured to project light toward a lens surface 22 of a lens 24 of the vehicle front lighting assembly 12. The light, indicated by arrows 26, may travel directly from the light source 20 to the lens surface 22, or may be reflected by a reflective surface portion 28 of the vehicle front lighting assembly 12. While the lens 24 is not illustrated as having any particular light refracting features, such as an arrangement of a plurality of refractive lens elements forming the lens 24 which is known in the art, this is only for the purpose of simplifying the illustration, and not a limitation. The light source 20 may be connected to a controller 30 by, for example, wires 32. The combination of the controller 30 and the vehicle front lighting assembly 12 may form a vehicle front lighting system 34.

The vehicle front lighting assembly 12 may include a variable tint electrowetting element 34 overlying a portion of the lens surface 22. The variable tint electrowetting element 34 is, in general, operable to a transparent state or clear state where the hue or color of light from the light source 20 that passes through the variable tint electrowetting element 34 is not changed substantially. The variable tint electrowetting element 34 may also be operable to a tinted state where the hue of light passing through the variable tint electrowetting element 34 is changed, i.e. tinted or colored.

In general, the variable tint electrowetting element 34, includes two fluids: an aqueous fluid, commonly referred to as the water layer; and a hydrophobic dielectric fluid, commonly referred to as the oil layer. In general, the distribution of the oil layer can be manipulated by applying a voltage to electrodes arranged about the variable tint electrowetting element 34. If the oil layer material is selected such that light passing through the oil layer is tinted, and the water layer is relatively transparent, then the variable tint electrowetting element 34 will be operable to variably tint light from the light source 20. WO 2011/017446, entitled COLORED CONDUCTIVE FLUIDS FOR ELECTROWETTING AND ELECTROFLUIDIC TECHNOLOGIES, published Feb. 10, 2011 by Clapp et al. provides a description of variable tint electrowetting elements, the entire contents of which are hereby incorporated by reference herein.

In another embodiment, the water layer material may be selected to tint light passing through the variable tint electrowetting element 34, and the oil layer material may be an opaque material so as to block light from passing through the variable tint electrowetting element 34 when the electrical bias is such that the oil layer spreads over the variable tint electrowetting element 34. With this configuration, the turn indicator portion 18 will appear either dark, i.e. not illuminated by the light source 20 because the light is blocked, or will appear to be illuminated with a tinted or colored light, and so when varied will appear similar to when a turn signal light is alternatingly turned on and off. In another embodiment the opaque material used for the oil layer may also be reflective and so reflect light from the light source 20 back towards the light source where it may be again reflected to pass through the headlight portion 16 of the lens 24 and so further illuminate the roadway 14.

The variable tint electrowetting element 34 may be coupled to the controller 30 via a connection 36 formed of, for example, multiple wires. Control signals communicated by the connection 36 may be voltages to directly control the variable tint electrowetting element 34, or may be digitally encoded by the controller 30 for transmission to the variable tint electrowetting element 34 that may include another processor (not shown) configured to decode the signal and control the variable tint electrowetting element 34 accordingly. The controller 30 may include a processor (not shown) such as a microprocessor or other control circuitry as should be evident to those in the art. The controller 30 may include memory, including non-volatile memory, such as electrically erasable programmable read-only memory (EEPROM) for storing one or more routines, thresholds and captured data. The one or more routines may be executed by the processor to perform steps for determining control signals output by the controller 30 for operating the variable tint electrowetting element 34 as described herein. The controller 30 may be configured to receive a light control signal 38 from, for example, a turn signal selector 40, and determine the control signal output onto the connection 36 in order to control the state of the variable tint electrowetting element 34 based on a light control signal 38.

Figure 3:
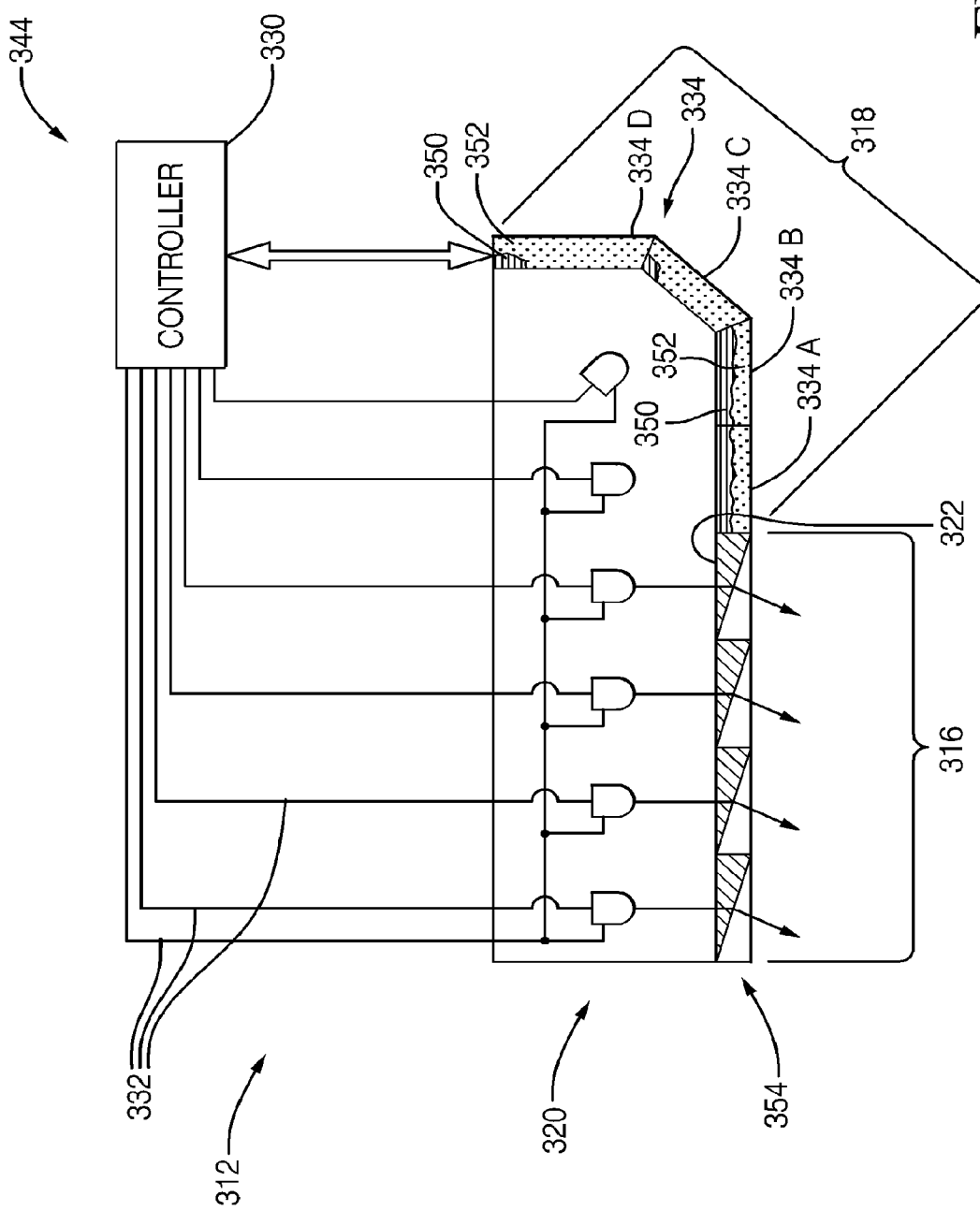
FIG. 3 is block diagram of a vehicle front lighting system including a top cut-away view of a vehicle front lighting assembly in accordance with one embodiment.

FIG. 3 illustrates a non-limiting example of a vehicle front lighting assembly 312. Similar to FIG. 1, a lens surface 322 is segregated into a headlight portion 316 and a turn signal portion 318. In this non-limiting example, a light source 320 is illustrated as being formed of an array of light emitting diodes. A variable tint electrowetting element 334 overlies a portion of the lens surface 322. The variable tint electrowetting element 334 is illustrated here as having several variable tint electrowetting cells 334A, 334B, 334C, and 334D. Each of the cells generally includes material forming an oil layer 350 and a water layer 352 as described above. The illustrations of cells 334A and 334B suggest that those cells are activated, that is, the oil layer 350 is spread across the cell, and so the material forming the oil layer is interacting with light from nearby LEDs. In contrast, the illustration of cells 334C and 334D suggest that those cells are deactivated, that is the oil layer 350 is crowded into a corner of cell, and so the oil layer 350 is generally not interacting with light from the nearby LED's In one embodiment, the oil layer 350 may comprise a tinting material that colors or tints light passing through oil layer 350, and the water layer 352 may comprise a material that is substantially clear or transparent, and so does not substantially color or tint light passing through the water layer 352. For this configuration, light passing through cells 334A and 334B would be tinted, and light passing through cells 334C and 334D would not be tinted.

In another embodiment, the oil layer 350 may comprise an opaque material that prevents light from passing through oil layer 350, and the water layer 352 may comprise a material that is tinted and so colors or tints light passing through the water layer 352. For this configuration, light would be blocked from passing through cells 334A and 334B and so that area of the turn signal portion may appear dark, and light passing through cells 334C and 334D would be tinted. For either configuration, the variable tint electrowetting element 334 is operable to provide a turn indicator for a vehicle 10. It will be recognized that each of the cells may be independently operated by the controller 330.

FIG. 3 also illustrates a non-limiting example of several electrowetting prisms 354 overlying the headlight portion 316 of the lens surface 322. It will be recognized that the arrangement may include more than four electrowetting prisms, that the prisms may also overlay all or part of the variable tint electrowetting element 334, and that the prisms may be arranged in a two-dimensional array. Alternatively the vehicle front lighting assembly 312 may have electrowetting prisms overlying all or some of the variable tint electrowetting element 334 in the turn signal portion 318, with or without electrowetting prism overlaying all or part of the headlight portion 316. Electrowetting prisms use a water layer material that has a different index of refraction than the oil layer material, and alter the angle of the water/oil interface to vary a refraction angle as suggested in FIG. 3. For the case where one or more electrowetting prisms overlay all or part of the turn signal portion 318, the electrowetting prism may be used to variably direct light passing through the variable tint electrowetting element 334. For example, when variable tint electrowetting element 334 is in a transparent state, light may be directed to illuminate the roadway 14 and so supplement light from the headlight portion 316. Then, when the variable tint electrowetting element 334 is operated to a tinted state, then light may be directed sideways to provide a brighter turn indication to others not located in front of the vehicle 10.

Accordingly, a front lighting assembly 12, 312, and a controller 30 for a front lighting system 12, 312 is provided. The front light assembly 12 provides both forward lighting and turn indication lighting with a single bulb, and so allows for the elimination of a separate turn-signal bulb. Differing materials for the oil layer 350 and water layer 352 may be selected to provide a turn indication that, for example, changes from white light to amber light, or changes from no light to amber light, to provide a turn indication. Also, in some configurations, the oil layer 350 may be a reflective material so that light blocked by the variable tint electrowetting element 34, 334 may be reflected and redirected out of the headlight portion 316, and so not waste light energy.

While this invention has been described in terms of the preferred embodiments thereof, it is not intended to be so limited, but rather only to the extent set forth in the claims that follow.

We claim:

1. A vehicle front lighting assembly comprising:
   a light source configured to project light toward a lens surface; and
   a variable tint electrowetting element overlying a portion of the lens surface, wherein the variable tint electrowetting element is operable to a transparent state where hue of light from the light source passing therethrough is not substantially changed, and operable to a tinted state where the hue of light from the light source passing therethrough is changed.

2. The assembly in accordance with claim 1, wherein the light source comprises a light emitting diode.

3. The assembly in accordance with claim 1, wherein the light source comprises an array of light emitting diodes.

4. The assembly in accordance with claim 1, wherein changing the hue of light from the light source by the variable tint electrowetting element provides a turn indicator for a vehicle.

5. The assembly in accordance with claim 1, wherein the assembly further comprises an electrowetting prism overlying a portion of the lens surface, said prism configured to variably direct light passing therethrough.

6. The assembly in accordance with claim 1, wherein the assembly further comprises an electrowetting prism overlying the variable tint electrowetting element, said prism configured to variably direct light passing therethrough.

7. A vehicle front lighting system comprising:
   a light source configured to project light toward a lens surface;
   a variable tint electrowetting element overlying a portion of the lens surface, wherein the variable tint electrowetting element is operable to a transparent state whereby the hue of light from the light source passing therethrough is not substantially changed, and a tinted state where the hue of light from the light source passing therethrough is changed; and
   a controller configured to determine the state of the variable tint electrowetting element based on a light control signal.

8. A vehicle front lighting assembly comprising:
   a light source configured to project light toward a lens surface; and
   a variable tint electrowetting element overlying a portion of the lens surface, wherein the variable tint electrowetting element is operable to an opaque state whereby light from the light source is prevented from passing therethrough, and a tinted state where hue of light from the light source passing therethrough is changed.

9. The assembly in accordance with claim 8, wherein changing the hue of light from the light source by the variable tint electrowetting element is effective to provide a turn indicator for a vehicle.

10. The assembly in accordance with claim 8, wherein the variable tint electrowetting element reflects light when operated to the opaque state.

* * * * *